Feb. 27, 1923.
R. HOUSER
DEMOUNTABLE RIM
Filed Oct. 21, 1920.
1,446,705
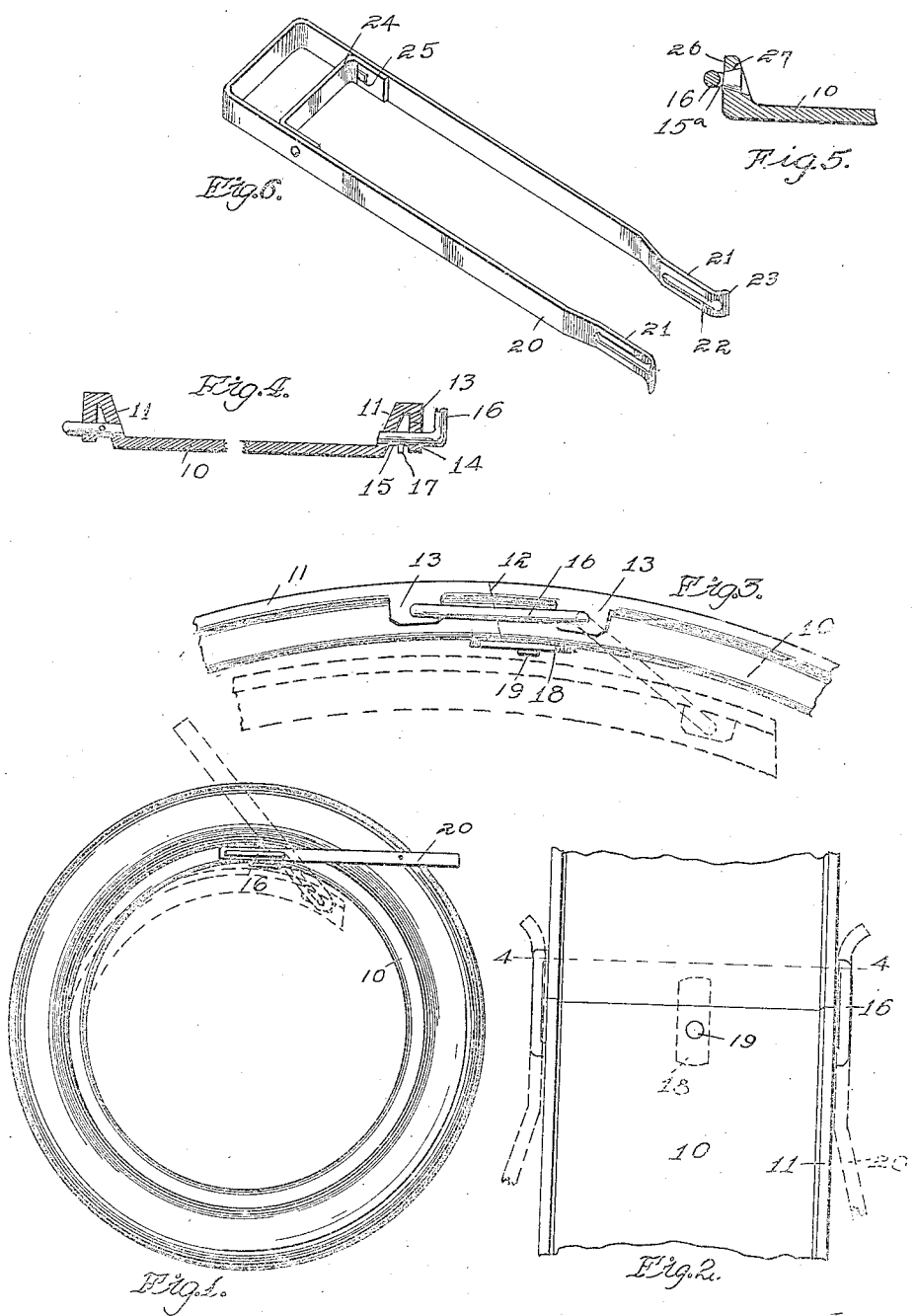
Inventor
Roy Houser
by Orwig & Hague, Attys Patented Feb. 27, 1923.

1,446,705

UNITED STATES PATENT OFFICE.

ROY HOUSER, OF CENTERVILLE, IOWA.

DEMOUNTABLE RIM.

Application filed October 21, 1920. Serial No. 418,555.

*To all whom it may concern:*

Be it known that I, ROY HOUSER, a citizen of the United States, and resident of Centerville, in the county of Appanoose and State of Iowa, have invented a certain new and useful Demountable Rim, of which the following is a specification.

This invention relates to improvements in demountable rims of the type formed annular and having ends designed to lie adjacent when the tire is in place, and capable of having one end underlap the other to decrease the diameter of the rim for the purpose of removing the tire. Rims of this class, and especially the larger sizes, necessarily need to be made quite stiff to rigidly hold the tire in position relative to the wheel, and are therefore hard to manipulate. It has been customary heretofore to take the tire and rim to a garage or shop where suitable mechanism is installed for underlapping the ends of the rim so that the tire may be removed. Machinery of this class is too heavy and bulky to be carried in an automobile.
It is, therefore, the object of my invention to provide a simple, durable and inexpensive device for actuating the adjoining ends of the demountable rim of the class above referred to, so that the rim and the tire may be easily and quickly separated by the use of a small and simple tool, and also so constructed that the adjoining ends may be easily and rigidly locked in position.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of a demountable rim having a tire in place and showing my improved operating and locking device, the tool for operating the same being shown in position.

Figure 2 is a segmental plan elevation, showing the adjacent ends of the tire rim and my improved locking device in position, and also showing the operating tool in position in dotted lines.

Figure 3 is a side elevation of a segment of a rim, showing the two adjacent ends of a rim locked together by my improved device, and also showing one of the ends underlapped in dotted lines.

Figure 4 is a transverse section, taken on the line 4—4 of Figure 2.

Figure 5 is a detail sectional view, showing a modified form of mounting my improved locking device; and

Figure 6 is a perspective view of a tool for operating the locking device.

The numeral 10 indicates the rim, which is formed annular and provided with flanges 11, the flanges 11 being of the ordinary construction for the purpose of preventing the tire from moving laterally. Each end of the rim 10 and the flanges 11 are designed to lie adjacent, and are cut on a slight slant relative to the radius of the rim, as indicated at 12.

I have provided at each edge of the rim, near its ends, an inwardly projecting flange 13, said flanges being formed integral with said flanges 11. Each of the flanges 13 is provided with a hole 14, which is in line with a similar hole in the flange 11. These holes 14 are designed to receive the laterally projecting ends 15 of a link 16. The ends 15 are pivotally mounted and secured in position by means of pins 17. The links 16 are of such a length that the ends of the rim 10 and the flanges 11 will engage each other when the link is in the position shown in Figure 3. The beveled portions of said ends will permit the left-hand end member to swing downwardly and under the right-hand member, and when they are so moved the diameter of the rim 10 will be smaller than the inside diameter of the tire, so that the said rim may be easily removed from the tire.

For securing the ends of the rim in position relative to each other, I have provided a button 18, which is secured to one end of the rim by means of a rivet 19. The button 18 is considerably longer than it is wide, and so placed that when moved to position at right angles to that shown in Figure 2 it will disengage the opposite end of the rim 10. This will permit the links 16 to be operated.

It will be noted in Figure 2 that the links 16 are so mounted that they extend laterally beyond the edges of the face of the rim. This is for the purpose of making them accessible so that a tool may be provided for simultaneously operating the links.

To operate the links I have provided a tool 20 formed of a piece of strap iron substantially in the shape of a U, the free ends of the member being bent inwardly slightly and then at the extreme end curved outwardly. The inwardly extending portions 21 are provided with longitudinal slots 22 which have their outer ends terminating in the outwardly extending portions 23 of the member 20. Near the enclosed end of the member 20 I have provided a brace 24, which is secured in position by means of rivets or bolts 25 and is for the purpose of preventing the members 20 from spreading. The slots 22 are of a width slightly greater than the width of the links 16.

When it is desired to remove a rim from a tire, the operation is as follows:

The tool 20 is placed in position with one of the members 21 on each side of the tire and in line with the links 16, the members 21 being forced over the tire, which will spring inwardly on account of being deflated, and permit said members to pass. The tool is moved toward the links 16 and in a plane in which they lie, until the slots 22 pass over the said links to the position shown in solid lines in Figure 1. The enlarged portion of the member 20 will then rest over the tire, while the space between the members 21 will rest against the edge of the rim. The enclosed portion of the member 20 is then grasped and an upward and circular movement imparted thereto, which will cause the member 20 to assume the position shown in dotted lines in Figure 1. This will cause the ends of the flange 10 to overlap each other, as shown in Figures 1 and 3. The tool 20 is then removed, after which the rim may be easily removed.

The rim is placed in position by a reverse operation from the one just described.

After the rim has been placed in position it is locked by means of the member 18 being moved into the position shown in Figure 2. The inclined ends of the members 11 will not permit the left-hand member to be moved upwardly, while the button 18 will prevent its being moved inwardly or downwardly, as shown in Figure 3.

In Figure 5 I have shown a modified form of securing the laterally projecting ends 15 of the links 16 in position, which consists in providing the rim with a solid flange 26 having a conical opening 27 which is designed to receive the laterally projecting end 15$^a$ which is placed in position and then off-set to fill the conical opening, but allows enough space to permit the said member 15$^a$ to rotate therein. This construction in some cases might be preferred to the one shown in Figure 4.

It will therefore be seen that I have provided a locking device for demountable rims of the type having adjoining ends capable of being folded under, that will rigidly secure the ends in position when locked and which may be easily and quickly unlocked to permit the rim to be taken from the tire.

I claim as my invention:

1. A demountable rim comprising a transplit resilient annular member having its ends adjacent and its edges provided with flaring flanges, each of said flanges being provided near its end with an inwardly projecting auxiliary flange portion, the said auxiliary flange portions each being provided with an opening, a link for each set of corresponding auxiliary flanges having laterally extending ends, each of said laterally extending ends being designed to enter a corresponding opening of said auxiliary flanges, a key for each of the laterally extending portions of said link mounted between the auxiliary flange and its adjaent flange.

2. A demountable rim comprising a transplit resilient annular member having its ends adjacent and its edges provided with flaring flanges, each of said flanges being provided near its end with an inwardly projecting auxiliary flange portion, the said auxiliary flange portions each being provided with an opening, a link for each set of corresponding auxiliary flanges having laterally extending ends, each of said laterally extending ends being designed to enter a corresponding opening of said auxiliary flanges, a key for each of the laterally extending portions of said link mounted between the auxiliary flange and its adjacent flange, and means for locking the adjacent ends of said annular member in engagement with each other.

Des Moines, Iowa, October 7, 1920.

ROY HOUSER.